(12) United States Patent
Gräwe et al.

(10) Patent No.: US 7,582,695 B2
(45) Date of Patent: Sep. 1, 2009

(54) USE OF POLYMER POWDERS THAT ARE REDISPERSIBLE IN WATER AS A BINDING AGENT FOR JOINTING SAND

(75) Inventors: René Gräwe, Burghausen (DE); Gabriele Trifellner, Neuötting (DE)

(73) Assignee: Wacker Chemie AG, Munich (DE)

( * ) Notice: Subject to any disclaimer, the term of this patent is extended or adjusted under 35 U.S.C. 154(b) by 607 days.

(21) Appl. No.: 10/532,036

(22) PCT Filed: Oct. 16, 2003

(86) PCT No.: PCT/EP03/11489

§ 371 (c)(1), (2), (4) Date: Apr. 21, 2005

(87) PCT Pub. No.: WO2004/037741

PCT Pub. Date: May 6, 2004

(65) Prior Publication Data

US 2006/0020058 A1 Jan. 26, 2006

(30) Foreign Application Priority Data

Oct. 24, 2002 (DE) ................. 102 49 636

(51) Int. Cl.
*C08K 3/34* (2006.01)
*C08J 3/12* (2006.01)

(52) U.S. Cl. ................. 524/492; 523/340

(58) Field of Classification Search ......... 524/492; 523/340
See application file for complete search history.

(56) References Cited

U.S. PATENT DOCUMENTS

| | | | |
|---|---|---|---|
| 5,118,751 A | 6/1992 | Schulze et al. | |
| 5,753,733 A * | 5/1998 | Eck et al. | 524/265 |
| 6,242,512 B1 | 6/2001 | Figge et al. | |
| 6,262,167 B1 * | 7/2001 | Weitzel et al. | 524/513 |
| 6,605,663 B1 * | 8/2003 | Weitzel | 524/459 |

FOREIGN PATENT DOCUMENTS

| | | |
|---|---|---|
| DE | 3 726 293 | 2/1989 |
| DE | 4 421 970 | 1/1995 |
| DE | 19 531 515 | 2/1997 |
| DE | 19 654 152 | 6/1998 |
| DE | 19654152 A | 6/1998 |
| EP | 0 199 921 | 12/1986 |
| EP | 0199921 A | 12/1986 |
| EP | 0 401 674 | 12/1990 |
| EP | 0 968 977 | 1/2000 |
| JP | 05-085792 | 4/1993 |

OTHER PUBLICATIONS

Derwent Abstract corresponding to DE 3 726 293 [AN 1989-054927].
Derwent Abstract corresponding to DE 4 421 970 [AN 1995-037429].
Derwent Abstract corresponding to DE 19 531 515 [AN 1997-146738].
Derwent Abstract corresponding to DE 19 654 152 [AN 1998-363624].
Derwent Abstract corresponding to EP 0 199 921 [AN 1986-272943].
Derwent Abstract corresponding to EP 0 401 674 [AN 1990-369741].
Derwent Abstract corresponding to EP 0 968 977 [AN 1999-277908].
Caplus Abstract corresponding to JP 05-085792.
Fox, T.G. , Bull. Am. Physics Soc. 1, 3, p. 123 (1956).
Polymer Handbook, 2nd Edition, J. Wiley & sons, New York (1975).
Patbase Abstract corresponding to EP 0 199 921 A, 1996.
Patbase Abstract corresponding to DE 196 54 152 A, 1998.

* cited by examiner

*Primary Examiner*—Kriellion A Sanders
(74) *Attorney, Agent, or Firm*—Brooks Kushman P.C.

(57) ABSTRACT

Dry jointing sand which is swept into joints is consolidated by addition of a powder composition employing either a polyvinyl alcohol-stabilized redispersible polymer powder which contains functional post-crosslinking comonomers, or a redispersible polymer powder stabilized by a polymer of one or more ethylenically unsaturated mono- or dicarboxylic acids and/or anhydrides thereof. The sand is bonded within the joints upon contact with moisture.

19 Claims, No Drawings

USE OF POLYMER POWDERS THAT ARE REDISPERSIBLE IN WATER AS A BINDING AGENT FOR JOINTING SAND

CROSS-REFERENCE TO RELATED APPLICATION

This application claims priority to PCT Appln. No. PCT/EP03/011489 filed Oct. 16, 2003, and to German application 102 49 636.6 filed Oct. 24, 2002.

BACKGROUND OF THE INVENTION

1. Field of the Invention

The invention relates to the use of polymer powders that are redispersible in water and based on polymers of ethylenically unsaturated monomers, stabilized with a protective colloid, as a binding agent for jointing sand.

2. Description of the Related Art

The laying of cobblestone paving is effected as a rule on a sand bed, loose sand or a sand slurry usually being swept in for filling the joints between the paving stones. A disadvantage thereby is that the sand is removed from the joint in the course of time, for example in the case of frequent rainfall.

EP-A 401674 discloses acid-curing amino resins as binding agents for joint filling materials. DE-A 3726293 discloses joint grouting materials comprising an emulsifiable epoxy resin and quartz sand. DE-A 4421970 describes a joint material comprising quartz sand, quartz powder and a polymer binding agent, liquid polybutadiene binding agents being used. EP-A 968977 relates to joint materials comprising a pasty component comprising synthetic resin dispersion and mineral fillers and a dry component comprising cement and quartz sand. JP-A 05-085792 discloses the use of a mixture of sand and redispersible powder based on polyvinyl esters, specifically vinyl acetate/VeoVa copolymers, as joint filling material. A disadvantage in the case of the reaction-crosslinking systems is the high price thereof and the complicated processing thereof. Joint filling materials comprising liquid binding agents likewise have disadvantages in the processing since they cannot be introduced into the joint by simply sweeping in. Sand mixtures comprising redispersible polyvinyl esters can be readily processed but result in only insufficient strengthening of the joint filling material.

SUMMARY OF THE INVENTION

It was therefore the object to provide a joint filling material comprising sand and binding agent, which material contains a pulverulent binder which leads to durable strengthening of the joint filling material.

DETAILED DESCRIPTION OF THE PREFERRED EMBODIMENT(S)

The invention relates to the use of polymer powders that are redispersible in water as binding agents for jointing sand, characterized in that functionalized, redispersible polymer powders from the group consisting of a) polyvinyl alcohol-stabilized copolymers of one or more monomers from the group consisting of the vinyl esters of straight-chain or branched alkylcarboxylic acids having 1 to 18 carbon atoms, acrylates or methacrylates of branched or straight-chain alcohols or diols having 1 to 18 carbon atoms, dienes, olefins, vinylaromatics and vinyl halides, which contain from 0.1 to 20% by weight, based on the total weight of the copolymer, one or more postcrosslinking comonomers from the group consisting of acrylamidoglycolic acid (AGA), methyl methylacrylamidoglycolate (MAGME), N-methylolacrylamide (NMA), N-methylolmethacrylamide (NMMA), allyl N-methylolcarbamate, alkyl ethers and esters of N-methylolacrylamide and of N-methylolmethacrylamide and of allyl N-methylolcarbamate, and acryloyloxypropyltri (alkoxy)- and methacryloyloxypropyltri(alkoxy)silanes, vinyl-trialkoxysilanes and vinylmethyldialkoxysilanes, and b) polymers of one or more monomers from the group consisting of the vinyl esters of straight-chain or branched alkylcarboxylic acids having 1 to 18 carbon atoms, acrylates or methacrylates of branched or straight-chain alcohols or diols having 1 to 18 carbon atoms, dienes, olefins, vinylaromatics and vinyl halides, which polymers are stabilized with polymers of ethylenically unsaturated mono- or dicarboxylic acids or anhydrides thereof, having an acid content of from 50 to 100 mol %, are used as a mixture with sand.

Suitable vinyl esters are those of carboxylic acids having 1 to 12 carbon atoms. Vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having 9 to 13 carbon atoms, for example VeoVa9® or VeoVa10® (trade name of Shell), are preferred. Vinyl acetate is particularly preferred.

Suitable monomers from the group consisting of acrylates or methacrylates are esters of straight-chain or branched alcohols having 1 to 15 carbon atoms. Preferred methacrylates or acrylates are methyl acrylate, methyl methacrylate, ethyl acrylate, ethyl methacrylate, propyl acrylate, propyl methacrylate, n-butyl acrylate, n-butyl methacrylate, tert-butyl acrylate, tert-butyl methacrylate and 2-ethylhexyl acrylate. Methyl acrylate, methyl methacrylate, n-butyl acrylate, tert-butyl acrylate and 2-ethylhexyl acrylate are particularly preferred.

Preferred vinylaromatics are styrene, methylstyrene and vinyltoluene. A preferred vinyl halide is vinyl chloride. The preferred olefins are ethylene and propylene, and the preferred dienes are 1,3-butadiene and isoprene.

Polymers which contain one or more monomer units from the group consisting of vinyl acetate, vinyl esters of α-branched monocarboxylic acids having 9 to 13 carbon atoms, vinyl chloride, ethylene, methyl acrylate, methyl methacrylate, ethyl acrylate, ethyl methacrylate, propyl acrylate, propyl methacrylate, n-butyl acrylate, n-butyl methacrylate, 2-ethylhexyl acrylate and styrene are particularly preferred. Most preferred are polymers of vinyl acetate with ethylene; of vinyl acetate, ethylene and a vinyl ester of α-branched monocarboxylic acids having 9 to 13 carbon atoms; of n-butyl acrylate with 2-ethylhexyl acrylate and/or methyl methacrylate; of styrene with one or more monomers from the group consisting of methyl acrylate, ethyl acrylate, propyl acrylate, n-butyl acrylate, 2-ethylhexyl acrylate; of vinyl acetate with one or more monomers from the group consisting of methyl acrylate, ethyl acrylate, propyl acrylate, n-butyl acrylate, 2-ethylhexyl acrylate and optionally ethylene; in the case of the polymer powders a), the corresponding amount of postcrosslinking comonomers also being contained.

Preferred postcrosslinking comonomers are N-methylolacrylamide (NMA), N-methylolmethacrylamide (NMMA) and the isobutoxy ethers thereof, and acryloyloxypropyltri(alkoxy)- and methacryloyloxy-propyltri(alkoxy) silanes, vinyltrialkoxysilanes and vinylmethyldialkoxysilanes, methoxy, ethoxy and ethoxypropylene glycol ether radicals being obtained as alkoxy groups. N-Methylolacrylamide (NMA), N-methylol-methacrylamide (NMMA), acryloyloxypropyltriethoxy- and methacryloyloxypropyltriethoxysilane, vinyltriethoxy-silane and vinylmethyldiethoxysilane are particularly preferred. Most preferred are N-methylolacrylamide and N-methylolmethacrylamide. The postcrosslinking comonomers are preferably contained in an amount of from 1 to 10% by weight, based on the total weight of the copolymer.

The choice of monomers or the choice of the proportions by weight of the comonomer is effected so that in general a glass transition temperature Tg of from −50° C. to +120° C., preferably from 0° C. to +50° C., results. The glass transition temperature Tg of the polymers can be determined in a known manner by means of differential scanning calorimetry (DSC). The Tg can also be calculated approximately beforehand by means of the Fox equation. According to Fox T. G., Bull. Am. Physics Soc. 1, 3, page 123 (1956), the following is true:

$1/Tg = x_1/Tg_1 + x_2/Tg_2 + \ldots + x_n/Tg_n$, where $x_n$ is the mass fraction (% by weight/100) of the monomer n and $Tg_n$ is the glass transition temperature in Kelvin of the homopolymer of the monomer n. Tg values for homopolymers are stated in Polymer Handbook 2nd Edition, J. Wiley & Sons, New York (1975).

Suitable polyvinyl alcohol protective colloids for the redispersible polymer powders of a) are partly hydrolyzed or completely hydrolyzed polyvinyl alcohols. Partly hydrolyzed polyvinyl alcohols having a degree of hydrolysis of from 80 to 95 mol % and a Höppler viscosity, in 4% strength aqueous solution, of from 1 to 30 mPa·s (method according to Höppler at 20° C., DIN 53015) are preferred. Partly hydrolyzed, hydrophobically modified polyvinyl alcohols having a degree of hydrolysis of from 80 to 95 mol % and a Höppler viscosity, in 4% strength aqueous solution, of from 1 to 30 mPa·s are also preferred. Examples of these are partly hydrolyzed copolymers of vinyl acetate with hydrophobic comonomers, such as isopropenyl acetate, vinyl pivalate, vinyl ethylhexanoate, vinyl esters of saturated alpha-branched monocarboxylic acids having 5 or 9 to 11 carbon atoms, dialkyl maleates and dialkyl fumarates, such as diisopropyl maleate and diisopropyl fumarate, vinyl chloride, vinyl alkyl ethers, such as vinyl butyl ether, and olefins, such as ethene and decene. The proportion of the hydrophobic units is preferably from 0.1 to 10% by weight, based on the total weight of the polyhydrolyzed polyvinyl alcohol. Mixtures of said polyvinyl alcohols may also be used.

Further preferred polyvinyl alcohols are partly hydrolyzed polyvinyl alcohol which have been rendered hydrophobic and are obtained by polymer-analogous reaction, for example acetalation of the vinyl alcohol units with $C_1$- to $C_4$-aldehydes, such as butyraldehyde. The proportion of the hydrophobic units is preferably from 0.1 to 10% by weight, based on the total weight of the partly hydrolyzed polyacetate. The degree of hydrolysis is from 80 to 95 mol %, preferably from 85 to 94 mol %, and the Höppler viscosity (DIN 53015, method according to Höppler, 4% strength aqueous solution) is from 1 to 30 mPa·s, preferably from 2 to 25 mPa·s.

Most preferred are polyvinyl alcohols having a degree of hydrolysis of from 85 to 94 mol % and a Höppler viscosity, in 4% strength aqueous solution, of from 3 to 15 mPa·s (method according to Höppler at 20° C., DIN 53015. Said polyvinyl alcohols are obtainable by means of processes known to the person skilled in the art or are commercially available. The polyvinyl alcohols are generally contained in the redispersible powder a) in an amount of, altogether, from 1 to 40% by weight, based on the total weight of the base polymer.

Suitable protective colloids based on polymers of ethylenically unsaturated mono- or dicarboxylic acids, for the redispersible polymer powders b), are homo- and copolymers of one or more monomers from the group consisting of acrylic acid, methacrylic acid, fumaric acid, maleic acid and maleic anhydride. Homo- and copolymers of acrylic acid or methacrylic acid and maleic anhydride are preferred. Polyacrylic acid and polymethacrylic acid are particularly preferred. Copolymers having acrylic acid, methacrylic acid and maleic acid (anhydride) units and units of monomers copolymerizable therewith are also preferred, the proportion of acid being from 80 to 99 mol %. Examples of copolymerizable monomers are alkenes, such as ethylene and propylene, vinylaromatics, such as styrene, acrylates, such as butyl acrylate, methacrylates, such as methyl methacrylate, alkyl vinyl ethers, such as methyl vinyl ether, methacrylamide and acrylamide. Examples of preferred copolymers are maleic acid/methyl vinyl ether, methacrylic acid/methyl methacrylate and methacrylic acid/acrylamide copolymers.

The molecular weights of said protective colloids for the redispersible polymer powders b) are $\leq 250,000$ g/mol, preferably $\leq 150,000$ g/mol, particularly preferably from 5000 to 50,000 g/mol, determined in each case as the weight average Mw, for example using gel permeation chromatography. The carboxyl-functional protective colloids are generally contained in the redispersible powder b) in an amount of, altogether, from 1 to 40% by weight, based on the total weight of the base polymer. Said carboxyl-functional protective colloids are obtainable by means of processes known to the person skilled in the art or are commercially available.

The preparation of the base polymer for the polymer powders a) and b) that are redispersible in water is effected by means of the customary polymerization processes, such as suspension polymerization and emulsion polymerization, at from 40° C. to 100° C., after initiation of the polymerization with the customary water-soluble or monomer-soluble initiators. In the case of said suspension and emulsion polymerization processes, polymerization is effected in the presence of surface-active substances, such as protective colloids and/or emulsifiers. After the end of the polymerization, postpolymerization can be effected for removal of residual monomers using known methods, or volatile residual monomers can be removed by means of distillation and/or passing through or passing over inert entraining gases, such as air, nitrogen or steam. For the preparation of the polymer powders, the aqueous dispersions, optionally after addition of protective colloids as atomization aids, are dried, for example by means of fluidized-bed drying, freeze drying or spray drying. The dispersions are preferably spray-dried. The proportion of protective colloid can be added before, during or after the polymerization.

The functionalized polymer powder that is redispersible in water is generally used in an amount of from 0.5 to 10% by weight, preferably from 1.0 to 5.0% by weight, based on the proportion of sand. Optionally, additives may also be incorporated into the mixture of sand and redispersible powder. Examples of these are crosslinking agents, such as bifunctional, masked aldehydes having at least 3 carbon atoms, from which aldehyde groups which are capable of forming covalent bonds with the OH group of the polyvinyl alcohol protective colloid of the redispersible powder a) are liberated in an acidic medium. Examples of these are the alkali metal hydrogen sulfite adducts of glutaraldehyde and succinaldehyde, preferably glutaraldehydebis(sodium hydrogen sulfite) and succinaldehydebis(sodium hydrogen sulfite). In general, these crosslinking agents are used in an amount of from 0.001 to 1.0% by weight, based on the redispersible polymer powder.

Suitable additives are also compositions for adjusting the pH of the redispersion of the polymer powders. In the case of the crosslinkable polymer powders a), pulverulent, acidic additives, such as alkali metal hydrogen sulfates, in particular sodium hydrogen sulfate, are preferably added. The amount added is preferably from 2 to 10% by weight, based on the polymer powder, which in general leads to a pH of the redispersion of pH $\leqq 2$. In the case of the polymer powders b), pulverulent, basic additives, such as calcium carbonate, are preferably added. The added amount is preferably from 5 to 40% by weight, based on the polymer powder, which in general leads to a pH of the redispersion of pH $\geqq 8$.

The mixture of jointing sand, polymer powder and optionally further additives is introduced in the dry or moist state by sweeping into the joints between the paving stones.

With said acidic additives, the crosslinking of the polymer powder a) is promoted in the presence of moisture. With said basic additives, the dissolution of the carboxyl-functional protective colloid of the polymer powder b) is promoted in the presence of moisture. In both cases, particularly under critical weather conditions, such as rain, the binding power of the powder is enhanced thereby, and washing of the sand out of the joint is prevented.

EXAMPLES

Example 1

A mixture of 95 parts by weight of standard sand T4, 5 parts by weight of a polymer powder comprising a vinyl acetate/ethylene copolymer (Tg=9° C.) and a polyacrylic acid (Mw about 20,000, 20% by weight, based on copolymer) and 1.1 parts by weight of calcium carbonate was prepared.

This mixture was shaped in a mold to give a right parallelepiped test specimen having the dimensions 1 cm×4 cm×16 cm and was compacted under pressure to a density of 1.56 g/cm$^3$.

Example 2

The procedure was analogous to example 1, except that a vinyl acetate/ethylene/N-methylolacrylamide copolymer (4% by weight of NMA, Tg=21.5° C.), which was stabilized with a partly hydrolyzed polyvinyl alcohol (degree of hydrolysis 88 mol %, Höppler viscosity 4 mPa·s, 15% by weight, based on copolymer), was used as the polymer powder, and 0.25 part by weight of potassium hydrogen sulfate (instead of calcium carbonate) was used.

Comparative Example 3

The procedure was analogous to example 1, except that a vinyl acetate/ethylene copolymer (Tg=10° C.), which was stabilized with a partly hydrolyzed polyvinyl alcohol (degree of hydrolysis 88 mol %, Höppler viscosity 4 mPa·s, 15% by weight, based on copolymer), was used as the polymer powder, and no acidic or basic additive was used.

In order to test the water resistance of the joint material, a test pipe was closed at the bottom by means of the molding, and the test specimen was covered with a layer of 57 ml of water. The water flow-through per unit time and area was determined. The moldings were tested immediately after their production and after a storage time of 24 hours at room temperature.

The lower the flow-through rate, the more stable the test specimen and the stronger the binding of the molding sand.

The following results were obtained:

Example 1

The water permeability of the molding was 21.3 l/m$^2$/min immediately after its production and improved to 3.1 l/m$^2$/min after 24 h.

Example 2

The water permeability of the molding was 3.4 l/m$^2$/min immediately after its production and improved to 1.1 l/m$^2$/min after 24 h.

Comparative Example 3

No binding of the molding could be achieved with a conventional redispersible powder. The water permeability therefore could not be determined.

The invention claimed is:

1. A process for jointing with sand, comprising forming a jointing composition by adding a binder to dry sand, the binder consisting essentially of a powder composition of one or more redispersible polymer powders, at least one redispersible polymer powder being a functionalized, redispersible polymer powder selected from the group consisting of
   a) polyvinyl alcohol-stabilized copolymers comprising the polymerized product of at least one monomer selected from the group consisting of vinyl esters of straight-chain or branched alkylcarboxylic acids having 1 to 18 carbon atoms; (meth)acrylates of branched or straight-chain alcohols or diols having 1 to 18 carbon atoms; dienes; olefins; vinylaromatics; and vinyl halides,
      further containing from 0.1 to 20% by weight, based on the total weight of the copolymer, of one or more postcrosslinking comonomers selected from the group consisting of acrylamidoglycolic acid; methyl methylacrylamidoglycolate; N-methylolacrylamide; -methylolmethacrylamide; allyl N-methylolcarbamate; alkyl ethers and esters of N-methylolacrylamide, of N-methylolmethacrylamide, and of allyl N-methylolcarbamate; (meth)acryloyloxypropyltri(alkoxy)silanes; vinyltrialkoxysilanes; and vinylmethyldialkoxysilanes, and
   b) polymers comprising the polymerized product of at least one monomer selected from the group consisting of vinyl esters of straight-chain or branched alkylcarboxylic acids having 1 to 18 carbon atoms; (meth)acrylates of branched or straight-chain alcohols or diols having 1 to 18 carbon atoms; dienes; olefins; vinylaromatics; and vinyl halides, said polymers stabilized with polymers comprising ethylenically unsaturated mono- or dicarboxylic acids or anhydrides thereof, having an acid content of from 50 to 99 mol %,
   c) optionally, when copolymer a) is employed, a bifunctional masked aldehyde, and
   d) optionally, a pulverulent acidic or basic additive, and sweeping the jointing composition in dry or moist form into joints.

2. The process of claim 1, wherein copolymers a) are employed, wherein copolymers a) contain one or more monomer units selected from the group consisting of vinyl acetate, vinyl esters of α-branched monocarboxylic acids having 9 to 13 carbon atoms, vinyl chloride, ethylene, methyl acrylate, methyl methacrylate, ethyl acrylate, ethyl methacrylate, propyl acrylate, propyl methacrylate, n-butyl acrylate, n-butyl methacrylate, 2-ethylhexyl acrylate and styrene, and contain from 1 to 10% by weight of one or more monomer units selected from the group consisting of N-methylolacrylamide, -methylolmethacrylamide, (meth)acryloyloxypropyltri-ethoxysilane, vinyltriethoxysilane and vinylmethyldiethoxysilane.

3. The process of claim 2, wherein at least one copolymer (a) is selected from the group consisting of polymers of vinyl acetate with ethylene; vinyl acetate with ethylene and a vinyl ester of at least one α-branched monocarboxylic acid having 9 to 13 carbon atoms; n-butylacrylate and methyl methacrylate; n-butyl acrylate with 2-ethylhexyl acrylate and methyl methacrylate; styrene with at least one monomer selected from the group consisting of methyl acrylate, ethyl acrylate, propyl acrylate, n-butyl acrylate and 2-ethylhexyl acrylate; vinyl acetate with at least one monomer selected from the group consisting of methyl acrylate, ethyl acrylate, propyl acrylate, n-butyl acrylate, 2-ethylhexyl acrylate, and optionally with ethylene; and with from 1 to 10% by weight of N-methylolacrylamide or N-methylolmethacrylamide.

4. The process of claim 1, wherein partly hydrolyzed polyvinyl alcohols or partly hydrolyzed, hydrophobically modified polyvinyl alcohols having a degree of hydrolysis of from 80 to 95 mol % and a Höppler viscosity, in 4% strength aqueous solution, of from 1 to 30 mPa·s are employed as a polyvinyl alcohol.

5. The process of claim 1, wherein copolymers b) are employed, wherein copolymers b) are derived from at least one monomer selected from the group consisting of vinyl acetate, vinyl ester(s) of α-branched monocarboxylic acids having 9 to 13 carbon atoms, vinyl chloride, ethylene, methyl acrylate, methyl methacrylate, ethyl acrylate, ethyl methacrylate, propyl acrylate, propyl methacrylate, n-butyl acrylate, n-butyl methacrylate, 2-ethylhexyl acrylate and styrene, and which are stabilized with from 1 to 40% by weight of a protective colloid selected from the group consisting of homo- and copolymers polymerized from at least one monomer selected from the group consisting of acrylic acid, methacrylic acid, fumaric acid, maleic acid and maleic anhydride.

6. The process of claim 1, wherein polyacrylic acid, polymethacrylic acid, or mixtures thereof are employed as the protective colloid of polymer(s) b).

7. The process of claim 5, wherein polyacrylic acid, polymethacrylic acid, or mixtures thereof are employed as the protective colloid of polymer(s) b).

8. The process of claim 1, wherein copolymers comprising acrylic acid, methacrylic acid, maleic acid, and/or maleic anhydride units and optimally units of monomers copolymerizable therewith are employed as protective colloids for polymer(s) b), the proportion of acid groups being from 80 to 99 mol %.

9. The process of claim 5, wherein copolymers comprising acrylic acid, methacrylic acid, maleic acid, and/or maleic anhydride units and optimally units of monomers copolymerizable therewith are employed as protective colloids for polymer(s) b), the proportion of acid groups being from 80 to 99 mol %.

10. The process of claim 2, wherein the powder composition containing copolymer(s) a) further comprise at least one bifunctional, masked aldehyde having at least 3 carbon atoms from which aldehyde groups are liberated in an acidic medium, as a crosslinking agent.

11. The process of claim 1, wherein a powder composition containing copolymer(s) a) is employed and contains at least one pulverulent, acidic additive.

12. The process of claim 1, wherein the powder composition comprising copolymer(s) b) is employed and contains at least one pulverulent, basic additive.

13. A jointing composition suitable for use in the process of claim 1, consisting essentially of:
a) polyvinyl alcohol-stabilized copolymers comprising the polymerized product of at least one monomer selected from the group consisting of vinyl esters of straight-chain or branched alkylcarboxylic acids having 1 to 18 carbon atoms; (meth)acrylates of branched or straight-chain alcohols or diols having 1 to 18 carbon atoms; dienes; olefins; vinylaromatics; and vinyl halides,
further containing from 0.1 to 20% by weight, based on the total weight of the copolymer, of one or more postcrosslinking comonomers selected from the group consisting of acrylamidoglycolic acid; methyl methylacrylamidoglycolate; N-methylolacrylamide; -methylolmethacrylamide; allyl N-methylolcarbamate; alkyl ethers and esters of N-methylolacrylamide, of N-methylolmethacrylamide, and of allyl N-methylolcarbamate; (meth)acryloyloxypropyltri(alkoxy)silanes; vinyltrialkoxysilanes; and vinylmethyldialkoxysilanes or
b) polymers comprising the polymerized product of at least one monomer selected from the group consisting of vinyl esters of straight-chain or branched alkylcarboxylic acids having 1 to 18 carbon atoms; (meth)acrylates of branched or straight-chain alcohols or diols having 1 to 18 carbon atoms; dienes; olefins; vinylaromatics; and vinyl halides, said polymers stabilized with polymers comprising ethylenically unsaturated mono- or dicarboxylic acids or anhydrides thereof, having an acid content of from 50 to 99 mol %, are used as a mixture with sand,
c) sand,
d) optionally, a bifunctional masked aldehyde when copolymer a) is employed, and
e) optionally, a pulverulent acidic or basic additive.

14. The composition of claim 13, wherein copolymers a) are employed, and contain one or more monomer units selected from the group consisting of vinyl acetate, vinyl esters of α-branched monocarboxylic acids having 9 to 13 carbon atoms, vinyl chloride, ethylene, methyl acrylate, methyl methacrylate, ethyl acrylate, ethyl methacrylate, propyl acrylate, propyl methacrylate, n-butyl acrylate, n-butyl methacrylate, 2-ethylhexyl acrylate and styrene, and contain from 1 to 10% by weight of one or more monomer units selected from the group consisting of N-methylolacrylamide, N-methylolmethacrylamide, (meth)acryloyloxypropyltri-ethoxysilane, vinyltriethoxysilane and vinylmethyldiethoxysilane.

15. The composition of claim 14, wherein at least one polymer (a) is selected from the group consisting of polymers of vinyl acetate with ethylene; vinyl acetate with ethylene and a vinyl ester of at least one α-branched monocarboxylic acid having 9 to 13 carbon atoms; n-butylacrylate and methyl methacrylate; n-butyl acrylate with 2-ethylhexyl acrylate and methyl methacrylate; styrene with at least one monomer selected from the group consisting of methyl acrylate, ethyl acrylate, propyl acrylate, n-butyl acrylate and 2-ethylhexyl acrylate; vinyl acetate with at least one monomer selected from the group consisting of methyl acrylate, ethyl acrylate, propyl acrylate, n-butyl acrylate, 2-ethylhexyl acrylate, and optionally with ethylene; and with from 1 to 10% by weight of N-methylolacrylamide or N-methylolmethacrylamide.

16. The composition of claim 13 wherein at least one polymer (a) is employed, the powder composition further comprising at least one bifunctional masked aldehyde having at least 3 carbon atoms and at least one pulverulent acidic additive.

17. The composition of claim 13 wherein copolymers b) are employed, and are derived from at least one monomer unit selected from the group consisting of vinyl acetate, vinyl ester(s) of α-branched monocarboxylic acids having 9 to 13 carbon atoms, vinyl chloride, ethylene, methyl acrylate, methyl methacrylate, ethyl acrylate, ethyl methacrylate, propyl acrylate, propyl methacrylate, n-butyl acrylate, n-butyl methacrylate, 2-ethylhexyl acrylate and styrene, and which are stabilized with from 1 to 40% by weight of a protective colloid selected from the group consisting of homo- and copolymers polymerized from at least one monomer selected from the group consisting of acrylic acid, methacrylic acid, fumaric acid, maleic acid and maleic anhydride.

18. The composition of claim 13 wherein polyacrylic acid, polymethacrylic acid, or mixtures thereof are employed as the protective colloid of polymer(s) b).

19. The composition of claim 13 wherein the powder composition employs copolymer(s) b), and contains at least one pulverulent, basic additive.

\* \* \* \* \*

UNITED STATES PATENT AND TRADEMARK OFFICE
CERTIFICATE OF CORRECTION

PATENT NO. : 7,582,695 B2 Page 1 of 1
APPLICATION NO. : 10/532036
DATED : September 1, 2009
INVENTOR(S) : Gräwe et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 874 days.

Signed and Sealed this

Fourteenth Day of September, 2010

David J. Kappos
*Director of the United States Patent and Trademark Office*